United States Patent
Mori

(10) Patent No.: US 7,355,638 B2
(45) Date of Patent: Apr. 8, 2008

(54) IMAGE PICKUP APPARATUS HAVING FUNCTION OF SUPPRESSING FIXED PATTERN NOISE

(75) Inventor: Keiichi Mori, Hachioji (JP)

(73) Assignee: Olympus Corporation, Tokyo (JP)

( * ) Notice: Subject to any disclaimer, the term of this patent is extended or adjusted under 35 U.S.C. 154(b) by 736 days.

(21) Appl. No.: 10/939,119

(22) Filed: Sep. 10, 2004

(65) Prior Publication Data

US 2005/0068431 A1  Mar. 31, 2005

(30) Foreign Application Priority Data

Sep. 17, 2003  (JP)  ............... 2003-324801

(51) Int. Cl.
*H05N 5/217* (2006.01)
(52) U.S. Cl. ............... 348/241; 348/247; 348/231.6
(58) Field of Classification Search .................. None
See application file for complete search history.

(56) References Cited

U.S. PATENT DOCUMENTS

2002/0003581 A1* 1/2002 Sato et al. ............. 348/333.11
2004/0113046 A1* 6/2004 Gorder et al. ............ 250/208.1

FOREIGN PATENT DOCUMENTS

JP  05-115025  5/1993
JP  05-115026  5/1993

* cited by examiner

*Primary Examiner*—Lin Ye
*Assistant Examiner*—Gevell Selby
(74) *Attorney, Agent, or Firm*—Straub and Pokotylo; John C. Pokotylo

(57) ABSTRACT

An image pickup apparatus comprises an image pickup unit including a light receiving pixel area including plural pixels each configured to accumulate photoelectric charge and to output signal and a comparative pixel area configured to output always, for example, dark signal in a state free of photoelectric charge, a first storing unit configured to store FPN component values of the light receiving pixel area, a second storing unit configured to store preliminarily FPN component value of the comparative pixel area, a first correction unit configured to perform predetermined comparison processing between the signal from the comparative pixel area and the FPN component value stored in the second storing unit, and to correct the FPN component values stored in the first storing unit, and a second correction unit configured to correct the signal from the light receiving pixel area by the FPN component values after correction by the first correction unit.

12 Claims, 5 Drawing Sheets

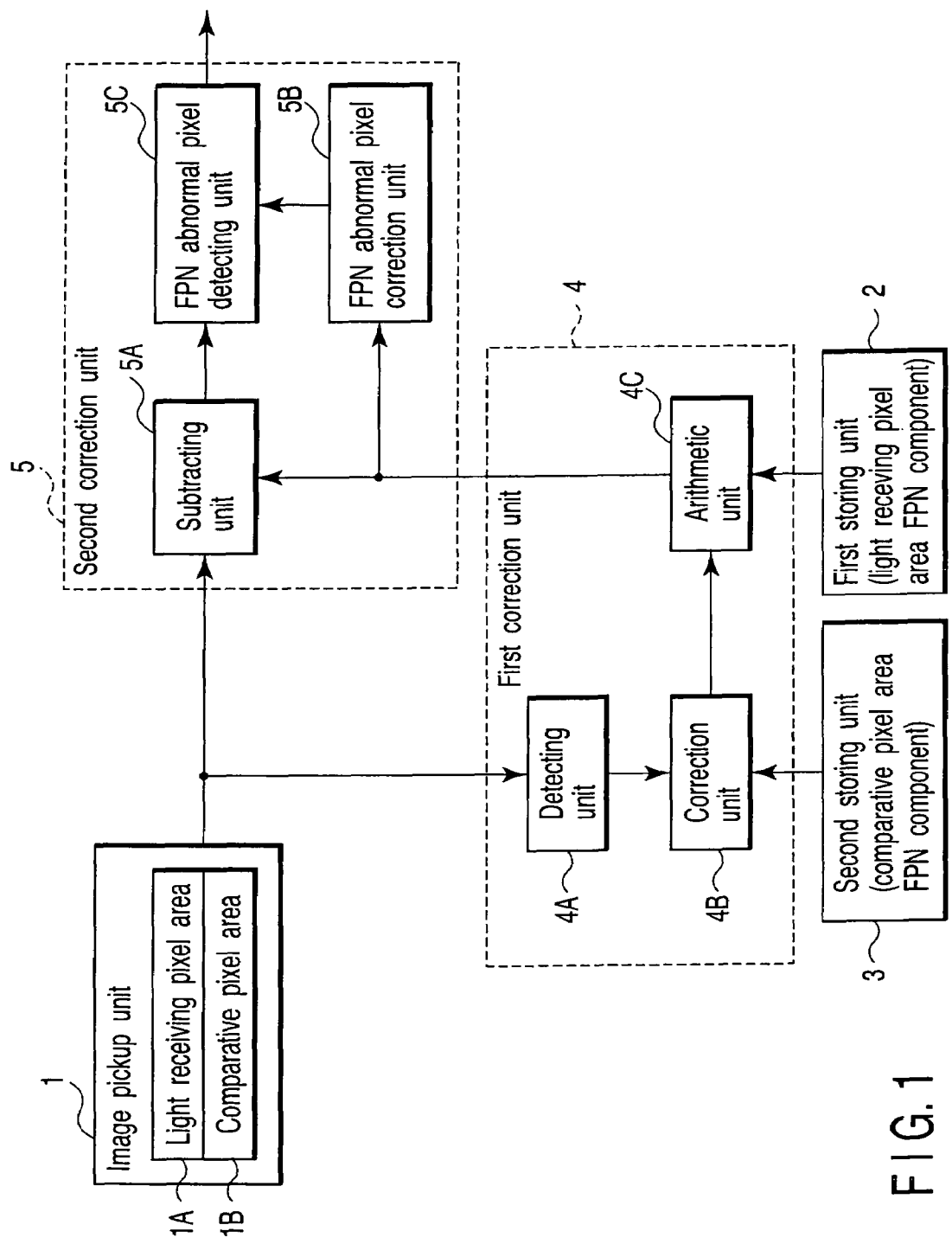
F I G. 1

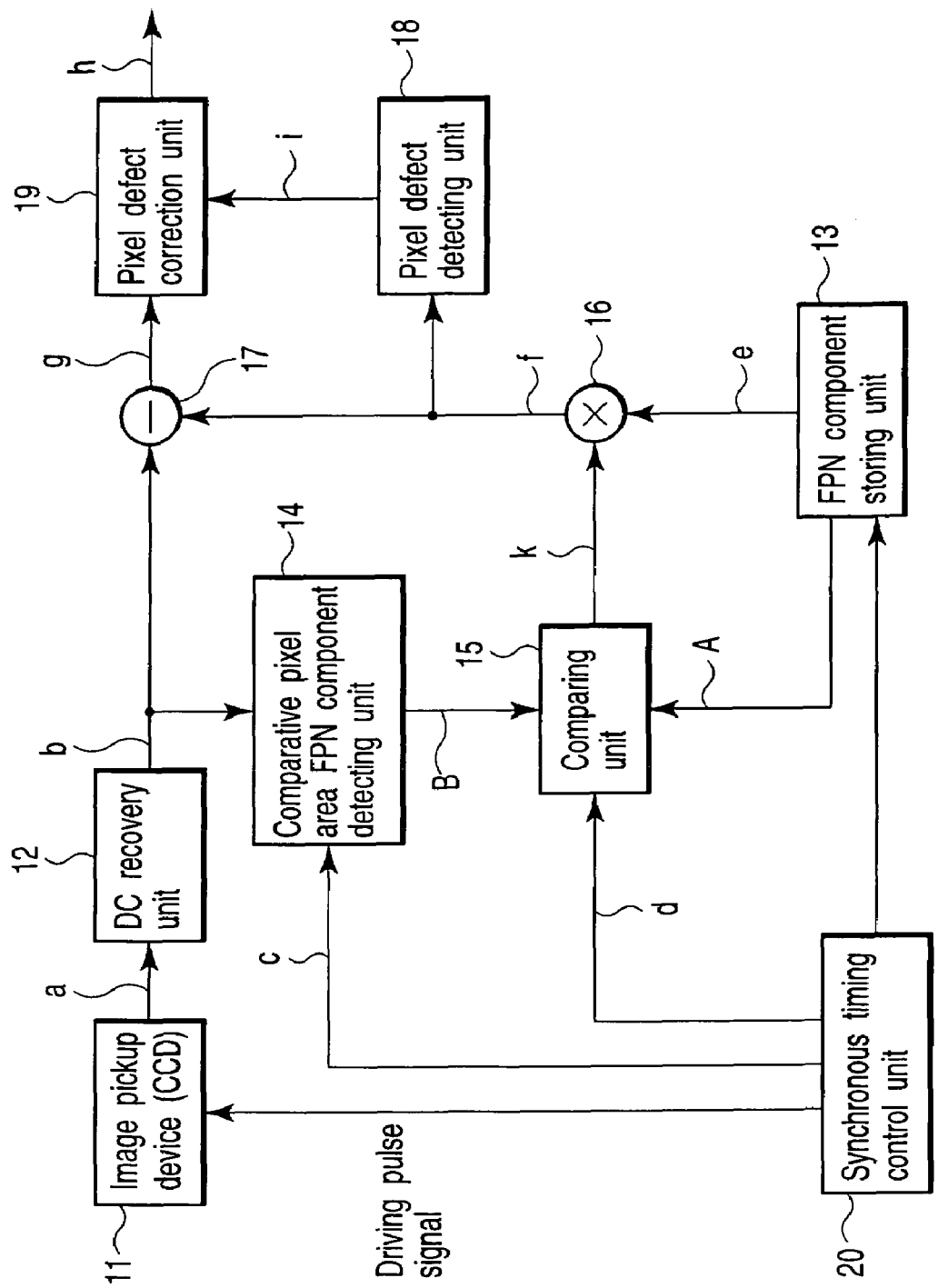
F I G. 2

IMAGE PICKUP APPARATUS HAVING FUNCTION OF SUPPRESSING FIXED PATTERN NOISE

CROSS-REFERENCE TO RELATED APPLICATIONS

This application is based upon and claims the benefit of priority from the prior Japanese Patent Application No. 2003-324801, filed Sep. 17, 2003, the entire contents of which are incorporated herein by reference.

BACKGROUND OF THE INVENTION

1. Field of the Invention

The present invention relates to an image pickup apparatus such as a solid-state image sensor, and more particularly to an image pickup apparatus having a function of suppressing fixed pattern noise.

2. Description of the Related Art

A solid-state image pickup apparatus has its own problems in fixed pattern noise (thereinafter abbreviated to FPN) due to characteristic fluctuations of individual pixels. Various techniques have been proposed so far for canceling the FPN.

For example, a video camera apparatus disclosed in Jpn. Pat. Appln. KOKAI Publication No. 5-115025 has an FPN suppressing circuit for reading out dark signal in a state free of photoelectric charge, right after resetting the accumulated charge of an image pickup device or while resetting; for A/D converting and accumulating in a storing unit; and for subtracting the dark signal accumulated in the storing unit from the image pickup signals read out from the image pickup device and A/D converted. It further comprises a conversion unit for converting the operation and function of the video camera accompanied by change in dark signal level before the A/D conversion. In cooperation with changeover action of the conversion unit and power supply action, the dark signal is re-entered in the storing unit of the FPN suppressing circuit.

Further, a video camera apparatus disclosed in Jpn. Pat. Appln. KOKAI Publication No. 5-115026 has an FPN suppressing circuit for reading out dark signal in a state free of photoelectric charge, right after resetting the accumulated charge of an image pickup device or while resetting; for A/D converting and accumulating in a storing unit; and for subtracting the dark signal accumulated in the storing unit from the image signals read out from the image pickup device and A/D converted. In this video camera apparatus, the FPN suppressing circuit is designed to operate by repeating automatically always at predetermined intervals to refresh.

BRIEF SUMMARY OF THE INVENTION

According to a first aspect of the present invention, there is provided an image pickup apparatus comprising:

an image pickup unit including a light receiving pixel area including plural pixels each configured to accumulate photoelectric charge and to output signal and a comparative pixel area configured to output always one of dark signal in a state free of photoelectric charge and signals in a state of resetting photoelectric charge;

a first storing unit configured to store and hold preliminarily fixed pattern noise (FPN) component values of the light receiving pixel area of the image pickup unit;

a second storing unit configured to store and hold preliminarily FPN component value of the comparative pixel area of the image pickup unit;

a first correction unit configured to perform predetermined comparison processing between the signal from the comparative pixel area of the image pickup unit and the FPN component value stored and held in the second storing unit, and to correct the FPN component values stored and held in the first storing unit; and a second correction unit configured to correct the signal from the light receiving pixel area of the image pickup unit by the FPN component values after correction by the first correction unit.

According to a second aspect of the present invention, there is provided an image pickup apparatus comprising:

image pickup means including a light receiving pixel area including plural pixels each for accumulating photoelectric charge and outputting signal and a comparative pixel area for outputting always one of dark signal in a state free of photoelectric charge and signals in a state of resetting photoelectric charge;

first storing means for storing and holding preliminarily fixed pattern noise (FPN) component values of the light receiving pixel area of the image pickup means;

second storing means for storing and holding preliminarily FPN component value of the comparative pixel area of the image pickup means;

first correction means for performing predetermined comparison processing between the signal from the comparative pixel area of the image pickup means and the FPN component value stored and held in the second storing means, and for correcting the FPN component values stored and held in the first storing means; and second correction means for correcting the signal from the light receiving pixel area of the image pickup means by the FPN component values after correction by the first correction means.

According to a third aspect of the present invention, there is provided a method of suppressing fixed pattern noise of an image pickup apparatus, comprising:

configuring an image pickup unit to include a light receiving pixel area including plural pixels configured to accumulate photoelectric charge and to output signal and a comparative pixel area configured to output always one of dark signal in a state free of photoelectric charge and signals in a state of resetting photoelectric charge;

storing and holding preliminarily fixed pattern noise (FPN) component values of the light receiving pixel area of the image pickup unit;

storing and holding preliminarily FPN component value of the comparative pixel area of the image pickup unit;

performing predetermined comparing processing between the signal from the comparative pixel area of the image pickup unit and the FPN component value stored and held, and correcting the FPN component values of the light receiving pixel area stored and held preliminarily; and correcting the signal from the light receiving pixel area of the image pickup unit by the FPN component values after the correcting.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing an image pickup apparatus according to one embodiment of the present invention;

FIG. 2 is a block diagram showing an image pickup apparatus according to a first example;

DETAILED DESCRIPTION OF THE INVENTION

Figure 3:
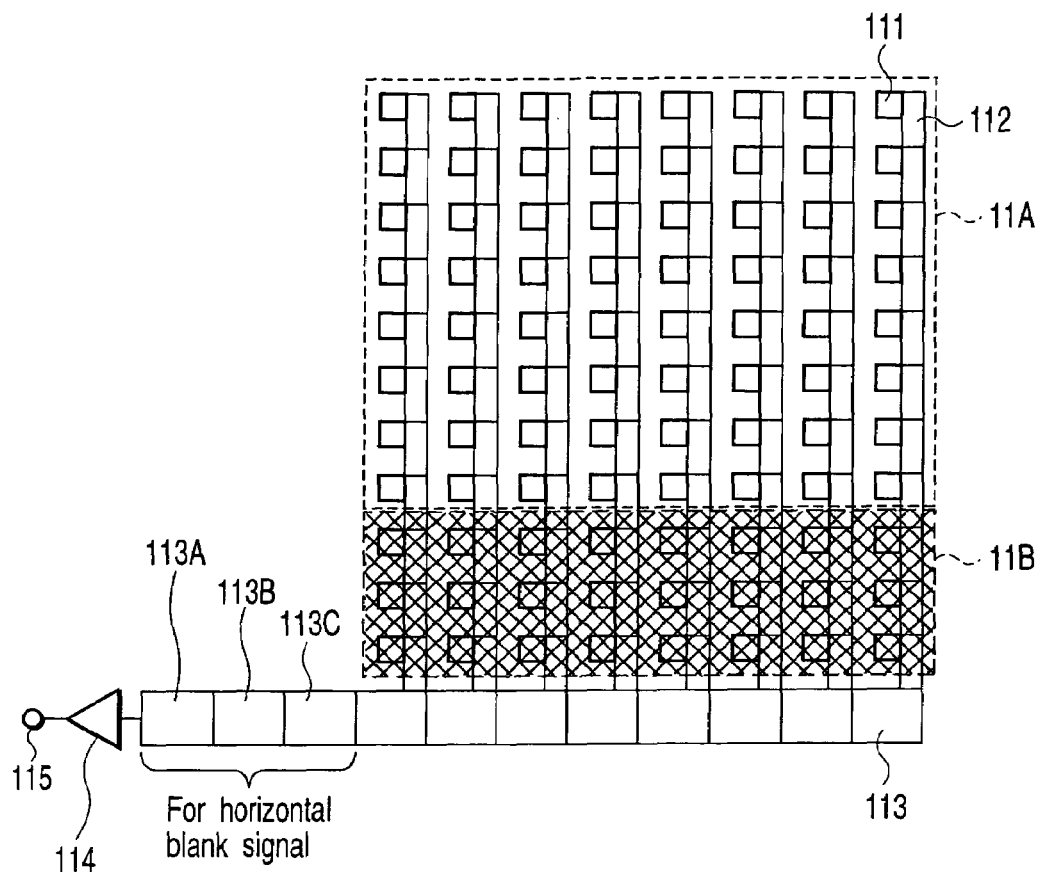
FIG. 3 is a diagram showing a configuration of an image pickup device used in the first example.

An image pickup apparatus according to one embodiment of the invention comprises, as shown in FIG. 1, an image pickup unit 1, a first storing unit 2, a second storing unit 3, a first correction unit 4, and a second correction unit 5.

The image pickup unit 1 includes a light receiving pixel area 1A and a comparative pixel area 1B. The light receiving pixel area 1A is an area composed of plural pixels for accumulating photoelectric charge and outputting signals. The comparative pixel area 1B is an area composed of plural pixels for always outputting dark signal in a state free of photoelectric charge or signal in a state of resetting photoelectric charge (signals read out right after resetting the accumulated charge or signals read out while resetting the accumulated charge). The image pickup unit 1 is preferably designed so that the output signal of the comparative pixel area 1B may be outputted ahead of the output signal of the light receiving pixel area 1A in a signal reading period of one field or one frame.

The first storing unit 2 is to store and hold preliminarily the FPN component values of the light receiving pixel area 1A of the image pickup unit 1, and the second storing unit 3 is to store and hold preliminarily the FPN component value of the comparative pixel area 1B of the image pickup unit 1. That is, the first storing unit 2 stores and holds dark signal in a state free of photoelectric charge or signal in a state of resetting photoelectric charge in each pixel of the light receiving pixel area 1A of the image pickup unit 1, preliminarily, at a predetermined time or in a predetermined condition, as each FPN component value. The second storing unit 3 stores and holds an average value or a median value (center value) of dark signal in a state free of photoelectric charge or signal in a state of resetting photoelectric charge in plural pixels of the comparative pixel area 1B of the image pickup unit 1, as the FPN component value.

The first storing unit 2 and second storing unit 3 are composed of nonvolatile memories. These FPN component values stored and held by the first storing unit 2 and second storing unit 3 are signals of the light receiving pixel area 1A and comparative pixel area 1B being read out once from the image pickup unit 1 at an arbitrary timing. Alternatively, the FPN component values may be signals of the average value or median value which is the result of reading out plural times the signals of the light receiving pixel area 1A and comparative pixel area 1B from the image pickup unit 1 in the same condition. At this time, the light receiving pixel area 1A is controlled so as to output dark signal in a state free of photoelectric charge or signal in a state of resetting photoelectric charge.

Alternatively, the first storing unit 2 and second storing unit 3 may be composed of volatile memories. In this case, right after power is supplied into the image pickup apparatus, the image pickup unit 1 is driven in a predetermined driving condition, and signals read out from the light receiving pixel area 1A and comparative pixel area 1B are stored and held.

The first correction unit 4 performs predetermined comparing processing between the signal from the comparative pixel area 1B of the image pickup unit 1 and the FPN component value stored and held in the second storing unit 3, and corrects the FPN component values stored and held in the first storing unit 2. That is, the first correction unit 4 is composed of a detecting unit 4A, a comparing unit 4B, and an arithmetic unit 4C. The detecting unit 4A detects the FPN component value of the output signal of the comparative pixel area 1B of the image pickup unit 1, out of the output signals of the image pickup unit 1. That is, the detecting unit 4A calculates the average value or median value of the signals from pixels of the comparative pixel area 1B of the image pickup unit 1 as the FPN component. The comparing unit 4B calculates a coefficient from the FPN component value detected by the detecting unit 4A and the FPN component value stored and held in the second storing unit 3. That is, the comparing unit 4B determines the coefficient by calculating the ratio of the FPN component value detected by the detecting unit 4A and the FPN component value stored and held in the second storing unit 3. The arithmetic unit 4C calculates and outputs on the basis of the coefficient outputted from the comparing unit 4B to the FPN component values stored and held in the first storing unit 2. That is, the arithmetic unit 4C multiplies the FPN component values stored and held in the first storing unit 2 and the coefficient outputted from the comparing unit 4B, and produces as an output signal.

The second correction unit 5 corrects the signal from the light receiving pixel area 1A of the image pickup unit 1 by the FPN component values after correction by the first correction unit 4. The second correction unit 5 is composed of a subtracting unit 5A, an FPN abnormal pixel detecting unit 5B, and an FPN abnormal pixel correction unit 5C. The subtracting unit 5A subtracts the output of the first correction unit 4 from the output signal of the light receiving pixel area 1A of the image pickup unit 1, and removes the FPN. The FPN abnormal pixel detecting unit 5B compares the output signal of the first correction unit 4 and a predetermined reference value, and determines presence or absence of an abnormal FPN component in the object pixel. The FPN abnormal pixel correction unit 5C corrects the output signal of the subtracting unit 5A corresponding to the pixel determined to be abnormal by the FPN abnormal pixel detecting unit 5B, from the peripheral pixel signals. In the image pickup apparatus having such a configuration, the FPN component values in the light receiving pixel area 1A and the FPN component value in the comparative pixel area 1B of the image pickup unit 1 are preliminarily stored and held, and in the image pickup operation, signals from the light receiving pixel area 1A and comparative pixel area 1B of the image pickup unit 1 obtained by one image pickup operation are used. In this case, first, the signal from the comparative pixel area 1B and the FPN component value preliminarily stored and held in the comparative pixel area 1B are compared as predetermined, whereby the FPN component values preliminarily stored and held in the light receiving pixel area 1A are corrected. Thereafter, the signal from the light receiving pixel area 1A of the image pickup unit 1 is corrected according to the corrected FPN component values. Therefore, the FPN can be suppressed by one image pickup operation.

The first storing unit 2 stores and holds the dark signal in a state free of photoelectric charge or signal in a state of resetting photoelectric charge in each pixel of the light receiving pixel area 1A, preliminarily at predetermined timing or in a predetermined condition, as the FPN component value for the pixel. By contrast, the second storing unit 3 stores and holds the average value or median value (center value) of the dark signal in a state free of photoelectric charge or signal in a state of resetting photoelectric charge in each pixel of the comparative pixel area 1B, as the FPN component value. Therefore, it is not required to store and hold FPN component values for plural pixels in the second storing unit 3, so that only a smaller storage capacity is required.

In the first correction unit 4, the detecting unit 4A detects the FPN component value of the output signal of comparative pixel 1B area of the image pickup unit 1. The comparing unit 4B calculates the coefficient from the detected FPN component value and the FPN component value stored and held in the second storing unit 3. The arithmetic unit 4C calculates the FPN component value stored and held in the first storing unit 2 according to the coefficient outputted from the comparing unit 4B. Thus, the FPN component value is corrected.

In the second correction unit 5, the subtracting unit 5A subtracts the output of the first correction unit 4, that is, the corrected values of the FPN component preliminarily stored and held in the first storing unit 2 from the output signal of the light receiving pixel area 1A of the image pickup unit 1, whereby the FPN is removed. The FPN abnormal pixel detecting unit 5B compares the output signal of the first correction unit 4 and a predetermined reference value, and thereby determines presence or absence of an abnormal FPN component value in the object pixel. If the abnormal FPN component value is present, the FPN abnormal pixel correction unit 5C corrects the output signal of the subtracting unit 5A corresponding to the pixel determined to be abnormal, by the predetermined pixel signals. That is, it is replaced by the calculated value. Therefore, the pixel defect can be detected and corrected.

The detecting unit 4A of the first correction unit 4 calculates the average value or median value of signals from each pixel of the comparative pixel area 1B of the image pickup unit 1 as the FPN component. The comparing unit 4B of the first correction unit 4 calculates the ratio of the detected FPN component value and the FPN component value stored and held in the second storing unit 3, that is, the ratio of the FPN component from the detecting unit 4A to the FPN component from the second storing unit 3, and obtains the resultant value as the coefficient. The arithmetic unit 4C of the first correction unit 4 multiplies the FPN component values stored and held in the first storing unit 2 and the calculated coefficient, and produces as an output signal.

The first and second storing units 2, 3 may be composed of nonvolatile memories. In this case, the FPN component values stored and held in the first and second storing units 2, 3 are the signals of each pixel read out once from the image pickup unit 1 at an arbitrary timing, or the average value or median value obtained by reading out plural times the signals of each pixel from the image pickup unit 1 in the same condition. Therefore, by using the average value or median value of plural signals, random noise can be suppressed. Alternatively, the first and second storing units 2, 3 may be composed of volatile memories. In this case, right after power is supplied into the apparatus, the image pickup unit 1 is driven in a predetermined driving condition, and read-out signals of pixels are stored and held. Therefore, the apparatus can be provided at a lower cost by using more inexpensive volatile memories than the nonvolatile memories, and the apparatus can be also composed of an analog circuit.

The image pickup unit 1 is designed so that the output signal of the comparative pixel area 1B may be outputted ahead of the output signal of the light receiving pixel area 1A in the signal reading period of one field or one frame. Therefore, since the output signal of the light receiving pixel area 1A is not outputted first, a memory for holding the output signal is not needed, so that the first correction unit 4 and second correction unit 5 can be operated sequentially.

As explained herein, according to this embodiment, the FPN component values of the light receiving pixel area 1A of the image pickup unit 1 and the FPN component value of the comparative pixel area 1B are stored and held. In image pickup operation, first, a predetermined comparing processing is made between the signal from the comparative pixel area 1B and the FPN component value preliminarily stored and held in the comparative pixel area 1B, and the FPN component values preliminarily stored and held with respect to the light receiving pixel area 1A are corrected. Thereafter, the signal from the light receiving pixel area 1A is corrected by this corrected FPN component values. Accordingly, the embodiment provides an image pickup apparatus capable of suppressing the FPN by one image pickup operation.

Examples of such an image pickup apparatus will be described below by referring to the accompanying drawings.

An image pickup apparatus according to a first example comprises, as shown in FIG. 2, an image pickup device 11, a DC recovery unit 12, an FPN component storing unit 13, a comparative pixel area FPN component detecting unit 14, a comparing unit 15, a multiplier 16, a subtractor 17, a pixel defect detecting unit 18, a pixel defect correction unit 19, and a synchronous timing control unit 20. Herein, the image pickup device 11 and DC recovery unit 12 correspond to the image pickup unit 1. The FPN component storing unit 13 corresponds to the first storing unit 2 and second storing unit 3, and is composed of a nonvolatile memory such as, for example, a ROM. The comparative pixel area FPN component detecting unit 14 corresponds to the detecting unit 4A of the first correction unit 4. The comparing unit 15 corresponds to the comparing unit 4B of the first correction unit 4. The multiplier 16 corresponds to the arithmetic unit 4C of the first correction unit 4. The subtractor 17 corresponds to the subtracting unit 5A of the second correction unit 5. The pixel defect detecting unit 18 corresponds to the FPN abnormal pixel detecting unit 5B of the second correction unit 5. The pixel defect correction unit 19 corresponds to the FPN abnormal pixel correction unit 5C of the second correction unit 5. The synchronous timing control unit 20 is designed to control the operation timing of the image pickup device 11, FPN component storing unit 13, comparative pixel area FPN component detecting unit 14, and comparing unit 15.

The image pickup device 11 is, for example, a CCD, and has a configuration as shown in FIG. 3. That is, photo detectors (PDs) 111 as pixels are disposed in lines and rows (matrix array). These photo detectors 111 have overflow drains (not shown), and when the voltage level of the overflow drains is controlled, the charge is reset, and accumulation start timing is controlled. Signal charge accumulated in each photo detector 111 is transferred to an adjacent vertical transfer route 112 by way of a transfer gate (not shown). This timing of transfer to the vertical transfer route 112 is the accumulation end timing.

The electric charge transferred to the vertical transfer route 112 is transferred once in one horizontal transfer period by one line in the downward direction in the diagram by a driving pulse (not shown) from the synchronous timing control unit 20. At this time, those beneath the vertical transfer route 112 are transferred to a horizontal transfer route 113. The electric charge of the portion of one line transferred to the horizontal transfer route 113 is sequentially transferred to the left direction in one horizontal synchronous period (HD) by a driving pulse (not shown) from the synchronous timing control unit 20. The electric charge is outputted from an output terminal 115 by way of a floating diffusion and preamplifier 114, and then supplied to the post-stage DC recovery unit 12.

With such a transfer, the electric charge accumulated in the photo detector 111 disposed in the lower line is transferred earlier, and the electric charge accumulated in the photo detector 111 disposed in the upper line is transferred later. In the image pickup unit 1, as described above, the output signal of the comparative pixel area 1B is outputted ahead of the output signal in the light receiving pixel area 1A within the signal reading period of one field or one frame. Therefore, in this example, the area of several lower lines of the photo detectors 111 is the comparative pixel area 1B, and the area of upper photo detectors 111 is the light receiving area 11A corresponding to the light receiving pixel area 1A. The area corresponding to the comparative pixel area 1B is, in this example, composed as a light shielding area 11B for outputting dark signal in a state free of photoelectric charge. Each photo detector 111 of this light shielding area 11B has the surface covered with a light shielding film of aluminum or the like. In the image pickup device 11 having such a configuration, therefore, a "dark signal component having temperature dependence and accumulation time dependence" is first outputted from the light shielding area 11B, and then a "photoelectric charge signal component having temperature dependence and accumulation time dependence" obtained from the light receiving area 11A is outputted.

Of the registers composing the horizontal transfer route 113, the vertical transfer route 112 is not connected to several (three in this example) H registers 113A, 113B, 113c at the output side. Accordingly, prior to the dark signal, a so-called horizontal blank signal is outputted. This horizontal blank signal is utilized in the post-stage DC recovery unit 12.

Figure 4:
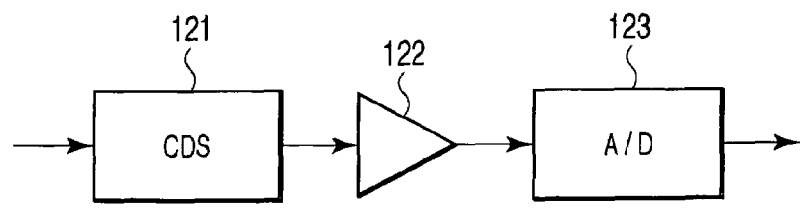
FIG. 4 is a block diagram showing a DC recovery unit used in the first example.

That is, the DC recovery unit 12 is composed of, as shown in FIG. 4, a correlative double sampling (hereinafter, abbreviated to CDS) circuit 121, an amplifier 122, and an A/D converter 123. The CDS circuit 121 samples and holds a signal period after clamping a field-through period, calculates the difference of the two, and suppresses reset noise. In this case, it is required to clamp at signal level not depending on temperature and accumulation time. In this example, the horizontal blank signal is utilized as such a reference signal not depending on temperature and accumulation time.

The FPN component storing unit 13 preliminarily stores the average signal value of each pixel of the light receiving area 11A read out from the DC recovery unit 12 as the image pickup device 11 is shielded by a light shielding member (not shown) and exposed plural times in the same condition (accumulation time, temperature), and the average signal value of all the pixels of the light shielding area 11B.

Figure 5:
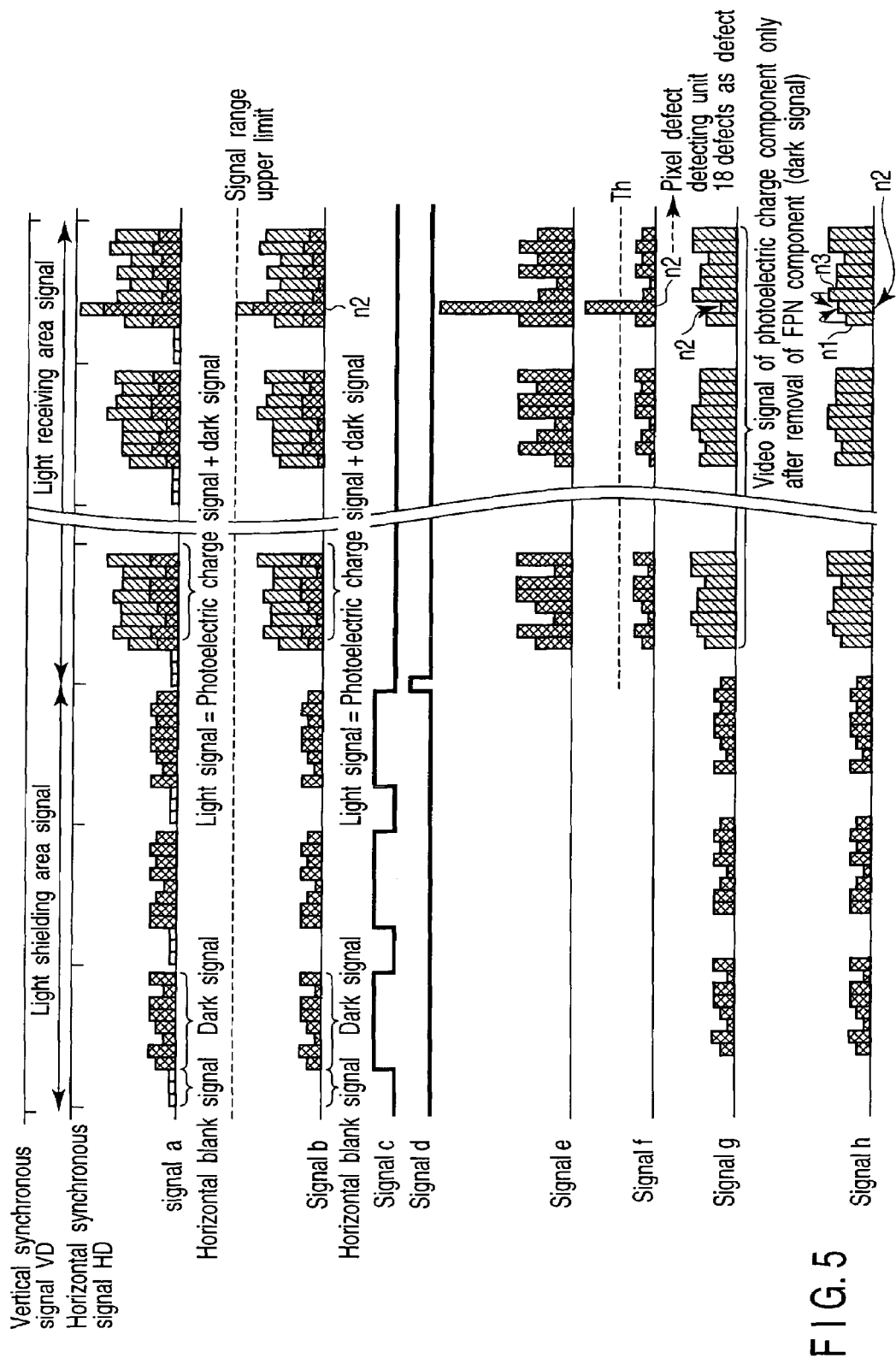
FIG. 5 is a timing chart of the image pickup apparatus according to the first example.

FIG. 5 is a timing chart of the image pickup apparatus of this example. Herein, signal "a" is an image pickup device output signal to be supplied from the image pickup device 11 to the DC recovery unit 12 (signal level being shown schematically). Signal "b" is a DC recovery unit output signal to be supplied from the DC recovery unit 12 to the comparative pixel area FPN component detecting unit 14 and subtractor 17. Signal "c" is a detection timing signal to be supplied from the synchronous timing control unit 20 to the comparative pixel area FPN component detecting unit 14. Signal "d" is a comparison execution timing signal to be supplied also from the synchronous timing control unit 20 to the comparing unit 15. Signal "e" is an FPN component storing unit output signal to be supplied from the FPN component storing unit 13 to the multiplier 16. Signal "f" is a multiplier output signal to be supplied from the multiplier 16 to the subtractor 17 and pixel defect detecting unit 18. Signal "g" is a subtractor output signal to be supplied from the subtractor 17 to the pixel defect correction unit 19. Signal "h" is a pixel defect correction unit output signal to be outputted as an output of the image pickup apparatus from the pixel defect correction unit 19.

That is, in one field divided by a vertical synchronous signal VD, in the horizontal synchronous period for several lines of the light shielding area 11B of the image pickup device 11, or in three horizontal synchronous periods in this example, the image pickup device 11 outputs the image pickup device output signal "a" including a horizontal blank signal component and a dark signal component by the light shielding area 11B. The DC recovery unit 12 suppresses the reset noise by making use of the horizontal blank signal component, and outputs the DC recovery unit output signal "b" including the suppressed dark signal component. The synchronous timing control unit 20 sets the detection timing signal "c" to be supplied to the comparative pixel area FPN component detecting unit 14 in a high state for the output period of this dark signal component. As a result, the comparative pixel area FPN component detecting unit 14 sequentially reads out the dark signal component of the DC recovery unit output signal "b", determines the average, for example, after reading out all dark signal components in the light shielding area 11B, and sends the value to the comparing unit 15 as detected dark signal average level B. In this example, the average value is determined, but the median value may be determined as mentioned above.

On the other hand, the comparing unit 15, to which such a detected dark signal average level B is supplied, compares at the leading edge of the comparison execution timing signal "d" from the synchronous timing control unit 20, and latches the result of calculation at the trailing edge. As shown in FIG. 5, in this example, the comparison execution timing signal "d" is designed to appear after reading of all dark signal components in the light shielding area 11B. Until this time, therefore, the comparing unit 15 does not operate, and a coefficient k is not supplied to the multiplier 16 from the comparing unit 15. Besides, other input to the multiplier 16, that is, the FPN component storing unit output signal "e" from the FPN component storing unit 13 is not outputted during this period. Therefore, the multiplier output signal "f" from the multiplier 16 is zero, and consequently, the subtractor 17 outputs the dark signal component in the DC recovery unit output signal "b" supplied from the DC recovery unit 12 directly as the subtractor output signal "g". Further, the subtractor output signal "g" is outputted to outside of the image pickup apparatus as the pixel defect correction unit output signal "h" from the pixel defect correction unit 19.

After all the dark signal components in the light shielding area 11B are read out, the comparison execution timing signal "d" from the synchronous timing control unit 20 is outputted, and the comparing unit 15 starts to compare. At this time, the FPN component storing unit 13 provides the comparing unit 15 with the dark signal average level A of the light shielding area 11B of the image pickup device 11 being stored and held preliminarily, by the timing signal from the synchronous timing control unit 20. As a result, the comparing unit 15 calculates (the detected dark signal average level B)/(stored dark signal average level A), and sends the result as the coefficient k to the multiplier 16. At the trailing edge of the comparison execution timing signal "d", the coefficient k is latched, and it is continuously supplied to the multiplier 16 hereinafter.

In the subsequent horizontal synchronous period, the image pickup device 11 outputs the image pickup device output signal "a" including the horizontal blank signal component, and a light signal component in the light receiving area 11A. The light signal component is a superposed product of the photoelectric charge signal component and dark signal component. The DC recovery unit 12 produces the DC recovery unit output signal "b" including the superposed light signal component of the photoelectric charge signal component and suppressed dark signal component. At this time, since the detection timing signal "c" to be supplied from the synchronous timing control unit 20 to the comparative pixel area FPN component detecting unit 14 remains in a low state, the comparative pixel area FPN component detecting unit 14 does not operate. Also the comparison execution timing signal "d" to be supplied from the synchronous timing control unit 20 to the comparing unit 15 remains in a low state, and new comparison operation is not executed. Hence, the comparing unit 15 continues to supply the latched coefficient k to the multiplier 16.

On the other hand, in the period of reading out signals from the light receiving area 11A, the FPN component storing unit 13 supplies the preliminarily stored and held FPN component corresponding to the light signal component about each photo detector 111 in the light receiving area 11A recovered in the DC recovery unit 12, as the FPN component storing unit output signal "e" corresponding to the timing signal given from the synchronous timing control unit 20. That is, the stored FPN component (dark signal component in this case) of each pixel is outputted in the time series. Each FPN component (dark signal component) of FPN component storing unit output signal "e" from the FPN component storing unit 13 is multiplied by the coefficient k in the multiplier 16, and given to the subtractor 17 and pixel defect detecting unit 18 as the multiplier output signal "f". Hence, in the subtractor 17, by subtracting the multiplier output signal "f" from the DC recovery unit output signal "b", the video signal of an only photoelectric conversion component obtained by removing the FPN component (dark signal component) from the light signal component can be obtained. It is supplied to the pixel defect correction unit 19 as the subtractor output signal "g".

That is, in the FPN component storing unit 13, the FPN components (dark signal components) of the photo detectors 111 in the light receiving area 11A are stored and held preliminarily, instead of the FPN components of all the photo detectors 111 in the image pickup device 11. In the photo detectors 111 of the light shielding area 11B, only the representative value (the average value in this example) is stored and held preliminarily. In the image pickup operation, by comparing only representative values, it is determined how much is changed from the stored and held signal by detecting the predetermined condition. Since the photo detectors 111 of the light receiving area 11A and photo detectors 111 of the light shielding area 11B are composed of same chip, the changing rates may be regarded almost identical. By the rate of change, the FPN components (dark signal components) of the photo detectors 111 of the light receiving area 11A stored and held preliminarily are converted, and by subtracting from the actually obtained light signal component, the FPN component (dark signal component) included in the light signal component can be removed.

At this time, on the other hand, if the dark signal is abnormal due to pixel defect in the image pickup device 11, the light signal component in the corresponding photo detector 111 (for example, line 2 row 2 (thereinafter abbreviated to n2) in the example of FIG. 5) in the DC recovery unit output signal "b" is limited to the signal range upper limit. Accordingly, the photoelectric charge component is short of signals, and the photoelectric charge component is abnormal in the subtractor output signal "g" after subtracting the dark signal component. If such a photoelectric charge component is left over, it appears to be disagreeable black spots when the exposure level is high, in particular. In this example, the multiplier output signal "f" and a predetermined detection threshold level Th are compared by the pixel defect detecting unit 18. If there is a dark signal component exceeding the detection threshold level Th, it is detected that a pixel defect is present in the corresponding photo detector 111. When such pixel defect is detected, the pixel defect detecting unit 18 outputs a defect correction instruction signal "i" to the pixel defect correction unit 19 so as to correct the photoelectric charge component corresponding to the photo detector 111 in the subtractor output signal "g". Receiving this defect correction instruction signal "i", the pixel defect correction unit 19 corrects the pixel defect by replacing the photoelectric charge component by the corresponding photo detector 111 by the average value of the photoelectric charge components of preceding and succeeding photo detectors 111 (n1 and n3).

The abnormal level of the defect pixel also depends on the temperature and accumulation time. Hence, when the entire FPN (dark signal) level is small, the defect level is also small, and no effect may appear in the image quality. When the detection threshold level Th is set at the level showing effect on the image quality, no correction is made as far as there is no effect in the image quality (excessive correction can be avoided), so that drop of resolution due to correction can be kept to a minimum.

Figure 6:
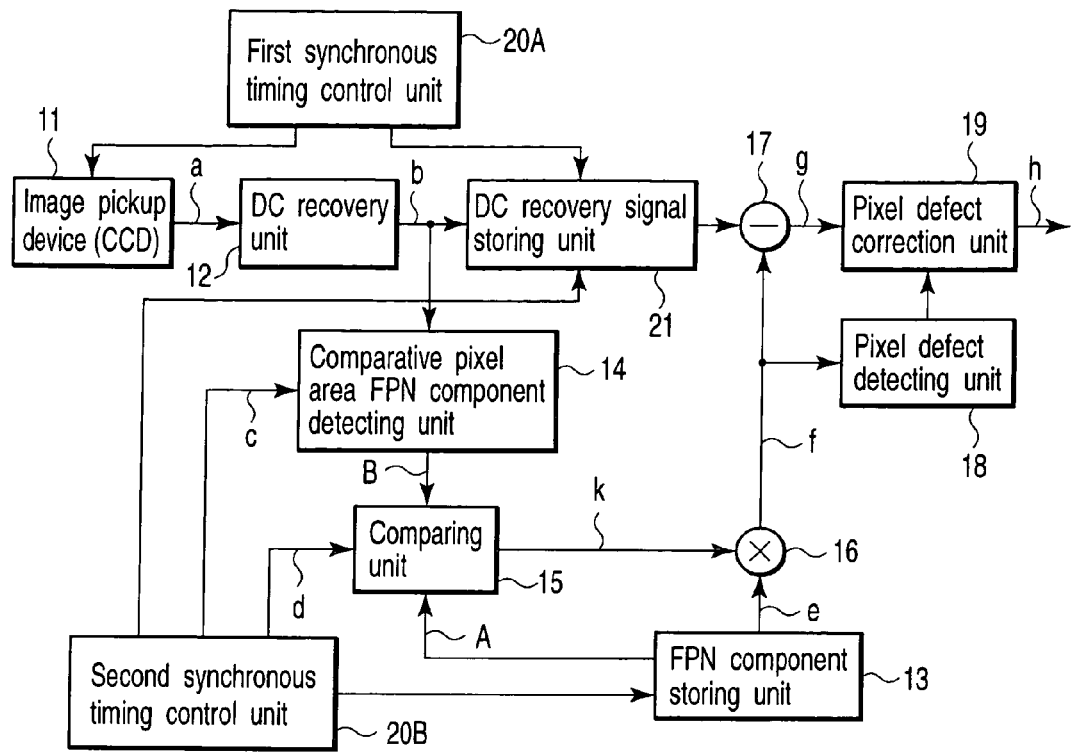
FIG. 6 is a block diagram showing an image pickup apparatus according to a second example.

An image pickup apparatus according to a second example will be described. As shown in FIG. 6, this image pickup apparatus comprises an image pickup device 11, a DC recovery unit 12, an FPN component storing unit 13, a comparative pixel area FPN component detecting unit 14, a comparatoring unit 15, a multiplier 16, a subtractor 17, a pixel defect detecting unit 18, a pixel defect correction unit 19, a first synchronous timing control unit 20A, a second synchronous timing control unit 20B, and a DC recovery signal storing unit 21.

Herein, the image pickup device 11 to pixel defect correction unit 19 are same as those in the first example. The first synchronous timing control unit 20A and second synchronous timing control unit 20B are intended to control the timing of parts at different frequency rates, for example, the first synchronous timing control unit 20A controls the reading rate of the image pickup device 11 and the second synchronous timing control unit 20B controls video monitor rates.

In this second example, only the light signal component of the DC recovery unit output signal "b" is once stored in the DC recovery signal storing unit 21, and the stored signal is subtracted in the same manner as in the first example.

Figure 7:
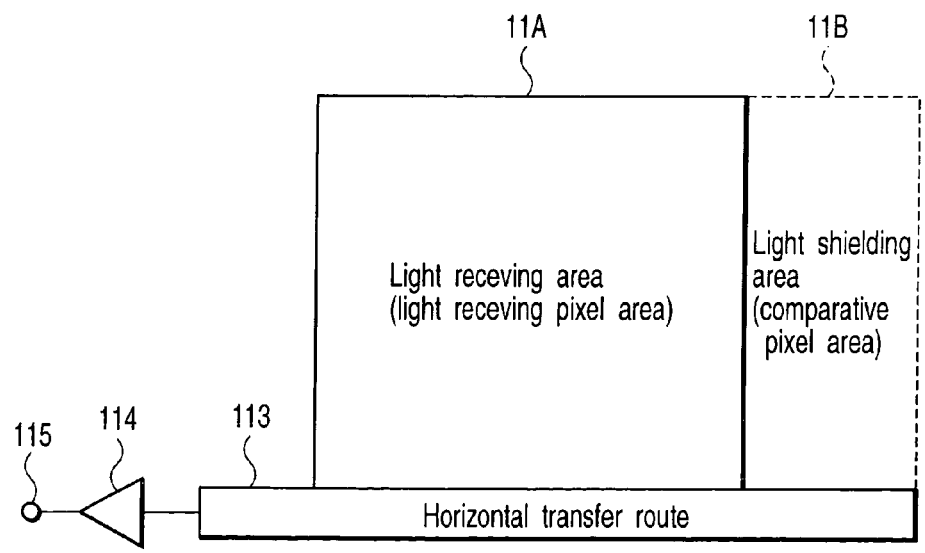
FIG. 7 is a diagram showing a configuration of an image pickup device used in the second example.

By using such a DC recovery signal storing unit 21, the light receiving area 11A and light shielding area 11B of the image pickup device 11 may be arranged as shown in FIG. 7. That is, in the configuration of the image pickup apparatus of the first example, the image pickup device 11 must be composed so that the light signal components may be read out from the light receiving area 11A after plural lines of dark signal components are read out from the light shielding area 11B. By contrast, in the configuration of the image pickup apparatus in the second example, since data is once stored in the DC recovery signal storing unit 21, it is free to read out in any arbitrary sequence. Therefore, there is no problem in the image pickup device 11 for reading out plural dark signal components and light signal components alternately, such as plural dark signal components, plural light signal components, or plural dark signal component, plural light signal components, . . . .

The invention is described herein by referring to an embodiment and its specific examples, but the invention is not limited to such embodiment and examples alone, and it can be changed and modified freely in various forms within the true spirit and scope of the invention. For example, the comparing unit 15 is shown to calculate the coefficient k by (the detected dark signal average level B)/(stored dark signal average level A), but a more precise value may be obtained by calculation of function, or instead of arithmetic operation, it may be determined by referring to a look-up table by using two inputs.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image pickup apparatus comprising:
   an image pickup unit including a light receiving pixel area including plural pixels each configured to accumulate photoelectric charge and to output signal and a comparative pixel area configured to output always one of dark signal in a state free of photoelectric charge and signal in a state of resetting photoelectric charge;
   a first storing unit configured to store and hold preliminarily fixed pattern noise (FPN) component values of the light receiving pixel area of the image pickup unit;
   a second storing unit configured to store and hold preliminarily FPN component value of the comparative pixel area of the image pickup unit;
   a first correction unit configured to perform predetermined comparison processing between the signal from the comparative pixel area of the image pickup unit and the FPN component value stored and held in the second storing unit, and to correct the FPN component values stored and held in the first storing unit; and
   a second correction unit configured to correct the signal from the light receiving pixel area of the image pickup unit by the FPN component values after correction by the first correction unit.

2. The apparatus according to claim 1, wherein
   the first storing unit is configured to store and hold one of the dark signal in a state free of photoelectric charge in each pixel in the light receiving pixel area of the image pickup unit and the signal in a state of resetting photoelectric charge in each pixel in the light receiving pixel area, one of at predetermined timing and in a predetermined condition, preliminarily as the FPN component value for the pixel, and
   the second storing unit is configured to store and hold the FPN component value in the comparative pixel area of the image pickup unit one of at the same timing and in the same condition as in the first storing unit.

3. The apparatus according to claim 1, wherein
   the comparative pixel area of the image pickup unit includes a plurality of pixels; and
   the second storing unit is configured to store and hold one of an average value and a median value of one of the dark signals in a state free of photoelectric charge in each pixel in the comparative pixel area and the signals in a state of resetting photoelectric charge in each pixel in the comparative pixel area, as the FPN component value.

4. The apparatus according to claim 1, wherein the first correction unit includes:
   a comparative pixel area FPN component detecting unit configured to detect the FPN component value of the output signal of the comparative pixel area of the image pickup unit, out of the output signals of the image pickup unit;
   a comparing unit configured to calculate a coefficient from the FPN component value detected by the comparative pixel area FPN component detecting unit and the FPN component value stored and held in the second storing unit; and
   an arithmetic unit configured to compute and output according to the coefficient outputted from the comparing unit to the FPN component values stored and held in the first stored unit.

5. The apparatus according to claim 1, wherein the second correction unit includes:
   a subtracting unit configured to remove the FPN by subtracting the output of the first correction unit from the output signal of the light receiving pixel area of the image pickup unit.

6. The apparatus according to claim 1, wherein the second correction unit further includes:
   an FPN abnormal pixel detecting unit configured to compare the output signal of the first correction unit and a predetermined reference value, and to determine presence or absence of an abnormal FPN component value of an object pixel; and
   an FPN abnormal pixel correction unit configured to correct the output signal of the subtracting unit corresponding to the pixel determined to be abnormal by the FPN abnormal pixel detecting unit, from peripheral pixel signals.

7. The apparatus according to claim 4, wherein
   the comparative pixel area FPN component detecting unit of the first correction unit is configured to calculate one of an average value and a median value of the signals from pixels of the comparative pixel area of the image pickup unit, out of the output signals of the image pickup unit, as the FPN component, the comparing unit of the first correction unit is configured to calculate the ratio of the FPN component value detected by the comparative pixel area FPN component detecting unit and the FPN component value stored and held in the second storing unit, and to output it as the coefficient; and the arithmetic unit of the first correction unit is configured to multiply the FPN component values stored and held in the first storing unit and the coefficient outputted from the comparing unit, and to output it as the output signal.

8. The apparatus according to claim 2, wherein
the first storing unit and second storing unit include nonvolatile memories, and
the FPN component values stored and held by the first and second storing units are one of:
the signals of the light receiving pixel area and comparative pixel area read out once from the image pickup unit at an arbitrary timing; and
one of the average values and the median values obtained by reading out plural times the signals of the light receiving pixel area and comparative pixel area from the image pickup unit in the same condition.

9. The apparatus according to claim 2, wherein the first storing unit and second storing unit
include volatile memories, and
are configured to store and hold the signals read out from the light receiving pixel area and comparative pixel area by driving the image pickup unit in a predetermined driving condition right after the power source is supplied in the image pickup apparatus.

10. The apparatus according to claim 1, wherein the image pickup unit is configured to output the output signal of the comparative pixel area ahead of the output signal of the light receiving pixel area, within a signal reading period of one of one field and one frame.

11. An image pickup apparatus comprising:
image pickup means including a light receiving pixel area including plural pixels each for accumulating photoelectric charge and outputting signal and a comparative pixel area for outputting always one of dark signal in a state free of photoelectric charge and signal in a state of resetting photoelectric charge;

first storing means for storing and holding preliminarily fixed pattern noise (FPN) component values of the light receiving pixel area of the image pickup means;

second storing means for storing and holding preliminarily FPN component value of the comparative pixel area of the image pickup means;

first correction means for performing predetermined comparison processing between the signal from the comparative pixel area of the image pickup means and the FPN component value stored and held in the second storing means, and for correcting the FPN component values stored and held in the first storing means; and second correction means for correcting the signal from the light receiving pixel area of the image pickup means by the FPN component values after correction by the first correction means.

12. A method of suppressing fixed pattern noise of an image pickup apparatus, comprising:
configuring an image pickup unit to include a light receiving pixel area including plural pixels configured to accumulate photoelectric charge and to output signal and a comparative pixel area configured to output always one of dark signal in a state free of photoelectric charge and signal in a state of resetting photoelectric charge;

storing and holding preliminarily fixed pattern noise (FPN) component values of the light receiving pixel area of the image pickup unit;

storing and holding preliminarily FPN component value of the comparative pixel area of the image pickup unit;

performing predetermined comparing processing between the signal from the comparative pixel area of the image pickup unit and the FPN component value stored and held, and correcting the FPN component values of the light receiving pixel area stored and held preliminarily; and correcting the signal from the light receiving pixel area of the image pickup unit by the FPN component values after the correcting.

* * * * *